US 6,794,590 B2

(12) United States Patent
Federspiel

(10) Patent No.: US 6,794,590 B2
(45) Date of Patent: Sep. 21, 2004

(54) SENSOR MAT FOR A VEHICLE SEAT

(75) Inventor: Laurent Federspiel, Münsbach (LU)

(73) Assignee: I.E.E. International Electronics & Engineering S.a.r.l., Luxembourg (LU)

(*) Notice: Subject to any disclaimer, the term of this patent is extended or adjusted under 35 U.S.C. 154(b) by 0 days.

(21) Appl. No.: 10/275,407

(22) PCT Filed: May 4, 2001

(86) PCT No.: PCT/EP01/05061
§ 371 (c)(1),
(2), (4) Date: Nov. 4, 2002

(87) PCT Pub. No.: WO01/86676
PCT Pub. Date: Nov. 15, 2001

(65) Prior Publication Data
US 2003/0173195 A1 Sep. 18, 2003

(30) Foreign Application Priority Data
May 5, 2000 (LU) .................................. 90578

(51) Int. Cl.[7] .............................................. H01H 3/00
(52) U.S. Cl. ................................. 200/85 R; 200/302.1
(58) Field of Search ........................... 200/85 R, 85 A, 200/511, 512, 515, 302.1; 297/217.3, 452.6, 180.12, 180.1

(56) References Cited

U.S. PATENT DOCUMENTS

| | | | | |
|---|---|---|---|---|
| 3,812,313 A | * | 5/1974 | Wolf et al. | 200/85 R |
| 5,895,900 A | * | 4/1999 | Okada et al. | 200/85 R |
| 5,896,090 A | * | 4/1999 | Okada et al. | 340/667 |
| 6,078,261 A | * | 6/2000 | Davsko | 340/573.4 |
| 6,144,003 A | * | 11/2000 | Kamishima | 200/515 |
| 6,483,055 B1 | * | 11/2002 | Tanabe et al. | 200/85 A |
| 6,531,671 B2 | * | 3/2003 | Yeh | 200/515 |
| 6,609,752 B2 | * | 8/2003 | Inoue | 297/217.3 |

FOREIGN PATENT DOCUMENTS

| | | | |
|---|---|---|---|
| DE | 197 56 804 A1 | 7/1998 | .......... H01H/13/16 |
| EP | 0 395 172 A2 | 10/1990 | ............ H01H/3/14 |
| EP | 0 669 229 A | 8/1995 | ............ B60R/21/20 |
| WO | WO 99/39166 | 8/1999 | ............ G01L/1/20 |

* cited by examiner

Primary Examiner—Michael A. Friedhofer
(74) Attorney, Agent, or Firm—McCormick, Paulding & Huber LLP

(57) ABSTRACT

A foil sensor mat includes a plurality of active regions which are interconnected by flexible connection lines. The sensor mat further includes two substantially elastic foil layers arranged at a certain distance from one another by a spacer. The spacer has a plurality recesses and each of the active regions are arranged in one of the recesses of the spacer. The foil sensor also includes an additional flexible protective covering of a waterproof material.

15 Claims, 2 Drawing Sheets

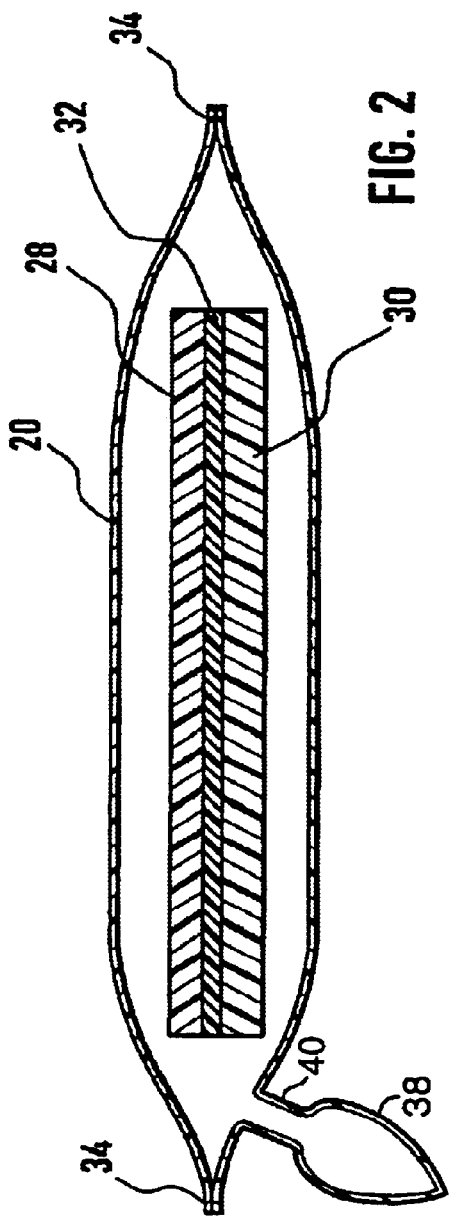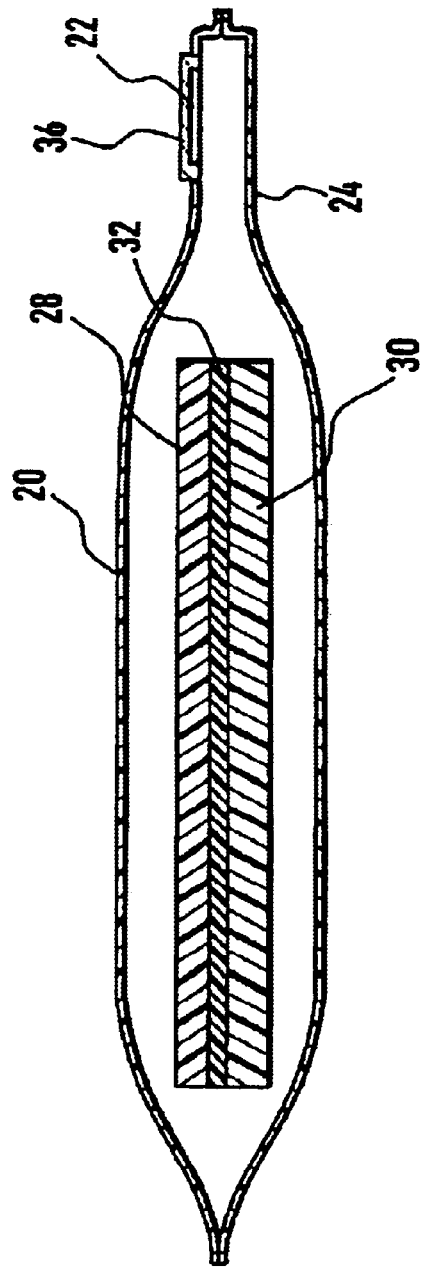

SENSOR MAT FOR A VEHICLE SEAT

CROSS-REFERENCE TO RELATED APPLICATION

This application is entitled to the benefit of and incorporates by reference essential subject matter disclosed in International Application No. PCT/EP01/05061 filed on May 4, 2001 and Luxembourg Patent Application No. 90578 filed on May 5, 2000.

FIELD OF THE INVENTION

The present invention relates to a sensor mat to be introduced into a vehicle seat, in particular a foil style sensor mat.

BACKGROUND OF THE INVENTION

Function elements in foil style, such as membrane switches, foil pressure switches or similar elements, in general comprise at least two essentially elastic foil layers positioned at a certain distance from one another. This is effected, for example, by means of a spacer which is arranged around the active region of the function element and to which the two foil layers are glued with their respective edges. In the active region of the function element, various contact arrays are attached on the foil layers. When the two foil layers are compressed, an electric contact is created between these arrays, so that the switch element is operated. When the pressure is released from the foil layers, these in turn are, due to their elasticity, restored to their spaced position and the electric contact between the various contact arrays is interrupted again.

In order to guarantee a strong probability of response for such function elements with quite various ambient pressures, the function elements in general also comprise ventilating ducts, which connect the space between the two foil layers with the surroundings and thus enable a pressure compensation between the surroundings and the space. Such a function element is for example described in U.S. Pat. No. 4,314,227, which relates to a foil pressure sensor with a pressure-depending resistor.

A foil style sensor mat comprises a plurality of such function elements which are distributed across a certain area. Thus, the function elements form the active regions of the sensor mat. They are interconnected by elastic connection lines, in which moreover the electric bonding of the function elements extends. The elastic connection lines are formed by the foil layers laminated together by means of the spacer and are manufactured by punching areas without function elements from a plane layer construction.

In such a sensor mat, too, there are ventilating ducts which connect the spaces created between the two carrier foils in the region of the function elements with the surroundings. The ventilating ducts in this case often interconnect each a plurality of function elements or active regions of the sensor mat, respectively, where they extend in the flexible connection lines and at one side end at the surface of the layer construction. In order to avoid the penetration of water into the active regions of the sensor mat, the ends of the ventilating ducts are generally covered by an air permeable, but waterproof material. Such water barriers are known as microfibre fabric under trade names, such as Gore Tex®.

As a sensor mat generally comprises a plurality of ventilating ducts (e.g. 30 to 40) which all end at various portions in the surface of the layer construction, accordingly, in the known sensor mats a corresponding number of microfibre patches have to be attached and fixed to the sensor mat. However, in view of the fact that the microfibre fabrics to be considered are relatively expensive compared to the other materials used in the sensor production, this means a not negligible increase in the production costs of such a sensor. Moreover, the gluing of the microfibre patches is relatively time consuming and represents an additional potential source of manufacturing defects.

SUMMARY OF THE INVENTION

Consequently, it is the object of the present invention to propose a simplified sensor mat for a vehicle seat.

According to the invention, this object is achieved by a foil style sensor mat, comprising a plurality of active regions interconnected by flexible connection lines and a flexible protective covering of a waterproof material. In this sensor mat, the protective covering can surround the whole sensor mat or completely surround only the connection lines of the sensor mat.

As the whole sensor mat or the flexible connection lines of the sensor mat, respectively, is surrounded by a protective covering, with the present sensor mat the attachment of a plurality of relatively expensive patches of microfibre fabrics to the individual ends of the ventilating ducts can be dispensed with. Thereby, the manufacture of the sensor mat is on the one hand, simplified, on the other hand, the production costs for the mat are reduced. In the present sensor mat, the waterproof material can, for example, comprise an inexpensive plastic foil, e.g. a PE-foil, into which the sensor mat or the connection lines of the sensor mat, respectively, are welded.

Another advantage of such a protective covering is the smooth surface of a plastic foil. Due to this smooth surface, the creaking sound between the sensor mat and a seat foam or a seat cover of a vehicle seat are considerably reduced. The pressure compensation between the individual active regions and the surroundings is e.g. effected within the protective covering with the sensor mat according to the invention. For this reason, the protective covering preferably comprises a compensating container 38 (shown in FIGS. 1 and 2) which is in fluid connection with the protective covering. The compensating container 3 can for example be connected in one piece with the protective covering, optionally via an extended connection duct 40 (shown in FIGS. 1 and 2). In this case, the compensating container can be advantageously positioned in a region of the seat outside the seating surface of the seat when the sensor mat is introduced into a vehicle seat.

In an advantageous embodiment, the protective covering comprises at least one vent opening, which is covered by means of a gas permeable but waterproof material. In this embodiment a pressure compensation can also be effected between the protective covering and the surroundings. The vent opening is preferably arranged in a region of the protective covering which will be outside the seating surface of the seat when the sensor mat is introduced into a vehicle seat. This ensures that the vent opening is not conglutinated when the sensor mat is glued to the seat foam. Moreover, by doing so, a load on the vent opening, for example covered by means of a microfibre patch, due to a passenger sifting on the seat can be effectively avoided.

The protective covering preferably comprises one or more fixing straps which are for example arranged at an outer edge of the protective covering. These fixing straps can be advantageously used for fixing the sensor mat e.g. at the seat foam or the seat substructure when the sensor mats are introduced into a vehicle seat. This can be effected by binding the fixing straps or by gluing, clamping or similar processes.

In an advantageous embodiment, the protective covering forms connection webs between various flexible connection lines. Thereby the number of connection lines at the actual sensor mat can be reduced as the necessary connection function is taken over by the protective covering. Thereby, the punching tools for punching the sensor mat are simplified and the tool length is reduced. Accordingly, the punching of the sensor mat can be effected with smaller punching forces and the blanking presses can have correspondingly smaller dimensions. As the connection webs of the protective covering are produced by thermal welding of a plastic foil, forces are not relevant in this process.

In a further advantageous embodiment, the protective covering surrounds the sensor mat with a certain clearance, i.e. the sensor mat has a certain mobility inside the protective covering. This is particularly advantageous if the sensor mat is to be glued onto a vehicle seat or if another function element, such as a seat heater, is to be glued onto the sensor mat. With conventional sensor mats which are glued to such a sandwich, distortions can be caused for example by thermal fluctuations, which distortions result in preloads of the active regions and thus adversely affect the response characteristic of the sensor mat. With the present design, the sensor mat has a certain mobility within the protective covering even after being glued, so that no preloads can develop any longer.

It should be noted that the protective covering can comprise a metallized foil and/or a UV-proof foil.

BRIEF DESCRIPTION OF THE DRAWINGS

In the following, one aspect of the invention is described with reference to the enclosed Figures. In the drawings:

FIG. 2 is a section through a flexible connection line of a sensor mat;

FIG. 3 is a section through a flexible connection line of a sensor mat.

DETAILED DESCRIPTION OF THE PREFERRED EMBODIMENT

Figure 1:
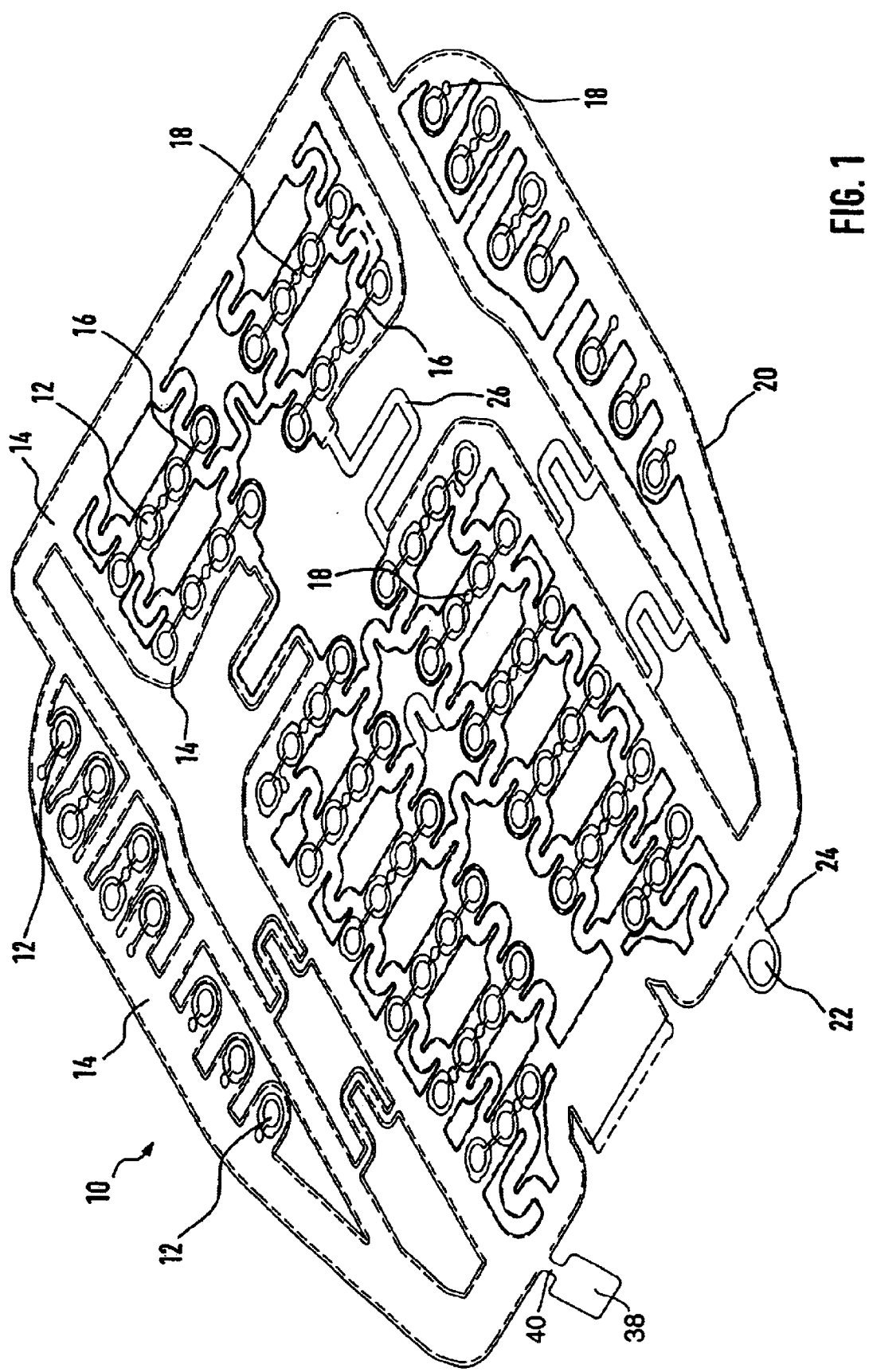
FIG. 1 is a view of an advantageous embodiment of a sensor mat.

In FIG. 1, a sensor mat 10 which, is optimized to be assembled in a vehicle seat is shown. The sensor mat 10 comprises a plurality of active regions 12 which are distributed across a certain area. The active regions 12 are interconnected by flexible connection lines 14, so that a coherent plane sensor mat is formed.

The sensor mat 10 preferably has a foil design wherein the active regions and the flexible connection lines comprise two essentially elastic foil layers, which are positioned by a spacer at a certain distance to one another. The spacer, for example a double-sided bonding sheet, comprises, at least in the region of the active regions of the sensor mat, each one cut-out, so that in these regions a space develops between the two foil layers.

In order to enable a pressure compensation between the space and the surroundings, the sensor mat 10 comprises ventilating ducts 16, which partly interconnect several active regions 12 and each end at least at one point 18 at the surface of the sandwich construction formed by the foil layers laminated together.

In order to avoid a penetration of water through the ventilating ducts 16 into the active regions 12, the sensor mat is surrounded by a protective covering 20. The protective covering 20 for example comprises a metallized foil into which the sensor mat or the flexible connection lines of the sensor mat, respectively, are welded. A plastic foil, such as a PE-foil, forms a good water barrier and can thus prevent a penetration of water into the active regions of the sensor mat. The pressure compensation between the active regions and the surroundings is thus effected within the protective covering 20.

The sensor mat 10 preferably has a certain clearance within the protective covering 20, so that it has a certain mobility even after the sensor mat has been introduced into a vehicle seat for example by gluing it onto a seat foam or by including it in the seat foam. Thereby, preloads onto the active regions 12 of the sensor mat 10 can be effectively avoided.

In order to enable a pressure compensation between the protective covering and the surroundings, the protective covering 20 has a ventilating aperture 22 at least at one point. The ventilating aperture 22 is preferably arranged in a projection 24 of the protective covering 20, so that the ventilating aperture 22 is arranged in a region outside the seating surface of the vehicle seat after the sensor mat has been introduced into a vehicle seat. The ventilating aperture 22 is preferably covered by a patch of a gas permeable, but waterproof material, for example a microfibre fabric, so that a penetration of water into the protective covering 20 can be avoided.

The right side of the sensor mat 10 shown in FIG. 1 illustrates a particularly advantageous embodiment of the protective covering 20. Indeed, the protective covering 20 on this side forms connection webs 26 between the individual connection lines 14, so that in these regions the number of connection lines of the actual sensor mat can be reduced. The connection webs 26 can for example, be produced by a plane welding of the top and bottom plastic foils of the protective covering 20.

FIGS. 2 and 3 show sections through a flexible connection line of a sensor mat, the section being in FIG. 3 in the region of the ventilating aperture 22 of the protective covering 20. One can see in each case a top foil layer 28 and a bottom foil layer 30 which are laminated together by means of a spacer 32. The thus formed sandwich structure of the actual sensor mat, is surrounded by a protective covering 20 consisting of two plastic foils welded together at their edges 34. In FIG. 3, one can additionally see a projection 24 of the protective covering 20, where a ventilating aperture 22 is attached. In order to prevent the penetration of water into the protective covering 20, the ventilating aperture 22 is here covered with a patch 36 of a gas permeable but waterproof material.

What is claimed is:

1. A foil style sensor mat comprising a plurality of active regions, which are interconnected by flexible connection lines, the sensor mat comprising two substantially elastic foil layers arranged at a certain distance from one another by a spacer, wherein said spacer comprises a plurality of recesses and wherein each of said active regions is arranged in one of said recesses of the spacer, and an additional flexible protective covering of a waterproof film material.

2. The sensor mat according to claim 1, wherein the protective covering completely surrounds the sensor mat.

3. The sensor mat according to claim 1, wherein the protective covering completely surrounds the connection lines of the sensor mat.

4. The sensor mat according to claim 1, wherein the protective covering comprises a compensating container in fluid connection with the protective covering.

5. The sensor mat according to claim 4, wherein the compensating container is connected in one piece with the protective covering.

6. The sensor mat according to claim 4, wherein the compensating container is connected with the protective covering via an elongated connection duct.

7. The sensor mat according to claim 1, wherein the protective covering comprises a vent opening covered by means of a gas permeable but waterproof material.

8. The sensor mat according to claim 1, wherein the protective covering comprises at least one fixing straps.

9. The Sensor mat according to claim 1, wherein the protective covering comprises connection webs between various flexible connection lines.

10. The sensor mat according to claim 1, wherein the connection lines are welded into the protective covering.

11. The sensor mat according to claim 1, wherein the protective covering surrounds the sensor mat with a certain clearance.

12. The sensor mat according to claim 1, wherein the protective covering comprises a PE-foil.

13. The sensor mat according to claim 1, wherein the protective covering comprises a metallized foil.

14. The sensor mat according to claim 1, wherein the protective covering comprises a UV-proof foil.

15. The sensor mat according to claim 1, wherein a thickness of said waterproof film material is substantially smaller than a thickness of said elastic foil layers.

* * * * *